United States Patent [19]

Hendershot, Jr.

[11] 4,110,645

[45] Aug. 29, 1978

[54] ELECTRIC MOTOR
[75] Inventor: James R. Hendershot, Jr., Amherst, N.H.
[73] Assignee: Vibrac Corporation, Chelmsford, Mass.
[21] Appl. No.: 660,237
[22] Filed: Feb. 23, 1976
[51] Int. Cl.² .............................................. H02K 21/26
[52] U.S. Cl. ...................................... 310/154; 310/266
[58] Field of Search ................................. 310/154, 266
[56] References Cited

U.S. PATENT DOCUMENTS

| | | | |
|---|---|---|---|
| 2,811,658 | 10/1957 | Brainard | 310/154 |
| 3,209,187 | 9/1965 | Angele | 310/154 X |
| 3,293,466 | 12/1966 | Henry-Baudot | 310/154 |
| 3,296,471 | 1/1967 | Cochardt | 310/154 |
| 3,356,877 | 12/1967 | Burr | 310/154 X |
| 3,424,578 | 1/1969 | Strnat et al. | 75/213 |
| 3,564,705 | 2/1971 | Cochhardt | 310/154 X |
| 3,828,213 | 8/1974 | Yamashita et al. | 310/154 X |
| 3,836,802 | 9/1974 | Parker | 310/154 |
| 3,906,268 | 9/1975 | de Graffeuried | 310/154 |

FOREIGN PATENT DOCUMENTS 1,174,418  7/1964  Fed. Rep. of Germany ........... 310/154

OTHER PUBLICATIONS

IBM Tech. Disclosure Bulletin, "Permanent Magnet DC Motor", Fisher et al., vol. 10, No. 8, 1/68 pp. 1253-54.
"Permanent Magnet DC Motor", IBM Tech. Disclosure Bulletin, Fisher & Hu, vol. 10, No. 8, 1/68, pp. 1233, 1234.

Primary Examiner—Donovan F. Duggan
Attorney, Agent, or Firm—Schiller & Pandiscio

[57] ABSTRACT

An improved yet relatively inexpensive motor is provided by mounting commercially-available magnets together with pole pieces to the interior surfaces of the housing of a motor. The pole pieces are then shaped in part, in situ, so as to form a cylindrical space between the pole pieces. A rotatable armature assembly and a stationary, magnetically-conductive core member are mounted within the cylindrical space formed by the shaped pole pieces with the armature assembly being radially-spaced from and disposed between the pole pieces on the one hand and the core member on the other hand.

3 Claims, 7 Drawing Figures

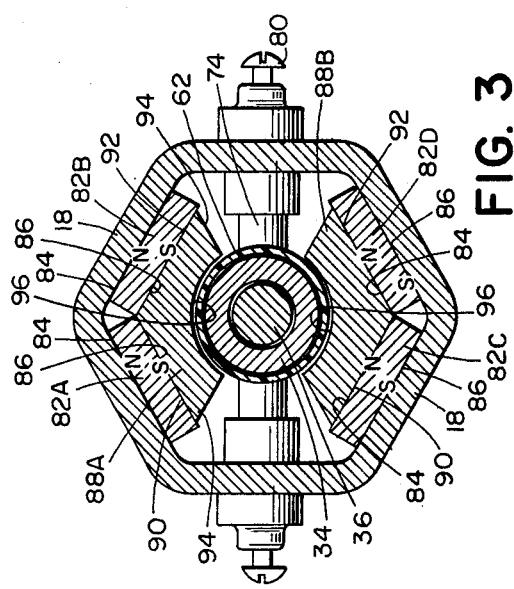
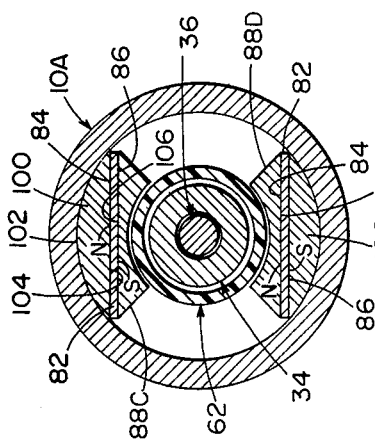
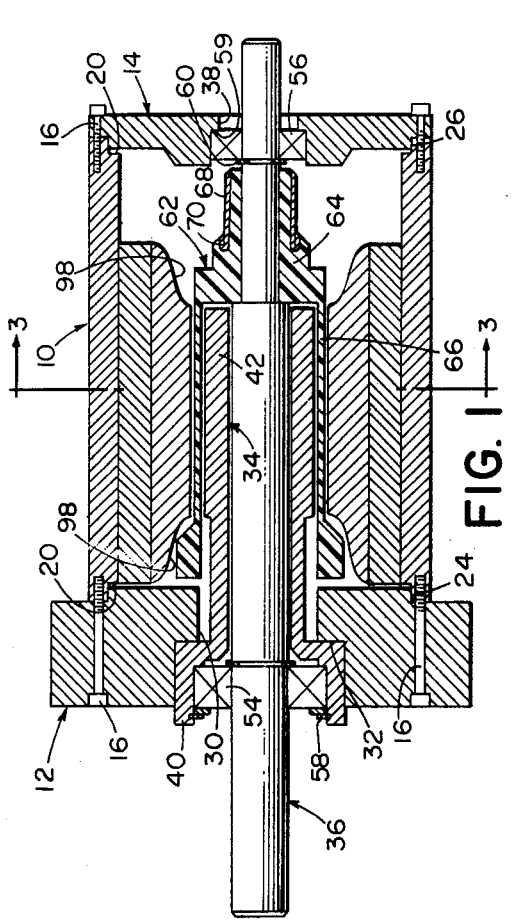
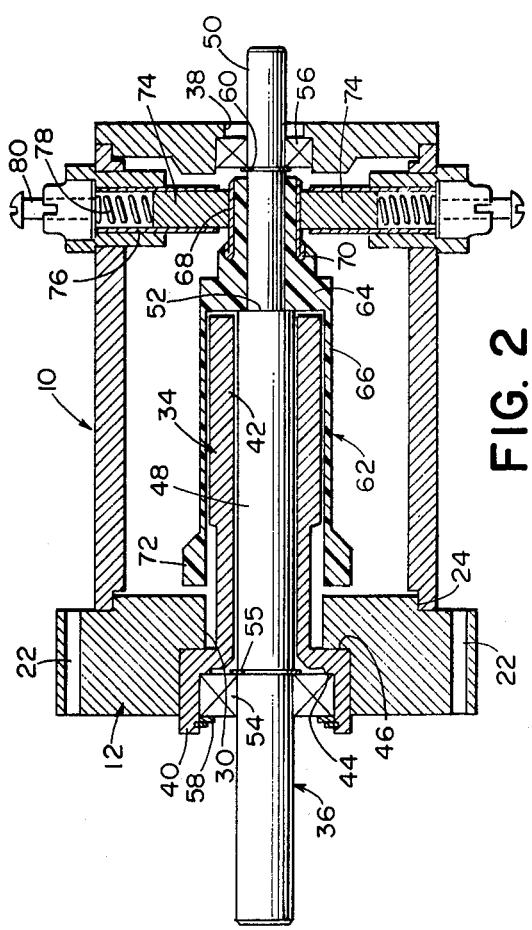

ELECTRIC MOTOR

The present invention relates to dynamo-electric machines, and more particularly to high efficiency permanent magnet electric motors and methods of making such motors.

One type of commerically-available permanent magnet direct current electric motor to which the present invention pertains is generally referred to as either a basket, ironless armature or shell armature motor and comprises a rotatable output shaft, a hollow armature which is concentrically mounted on the shaft so that a portion of the armature is radially-spaced from the shaft, and brushes for electrically energizing the armature. A stationary, magnetically-conductive core member extends into the space between the armature and shaft while a permanent magnet means, typically in the form of a cylinder, is mounted outside of and is radially spaced from the armature. Poles are provided to define a magnetic flux path between the magnetic means and the magnetically-conductive core member so that the armature is rotatable through the flux path. These poles may be inwardly extending, radially-directed salient pole sections which are integrally formed with the permanent magnets and which are concentrically mounted around the outside of the armature so that the magnetic flux path is established across the gap provided between each pole section and the cylindrical core. Alternatively, the poles may be separate pieces of magnetically-conductive material which engage the magnets and extend radially-inward towards and are spaced from the outside of the armature so that the flux path is established across the gap provided between each pole piece and the cylindrical core.

It is generally recognized that the more dense the magnetic field is between the pole sections or pole pieces and the stationary core member the greater the torque output of the motor. The strength of the magnetic flux through the gap depends in part, on the length of the gap, as well as the size, shape and material of the permanent magnets employed. Present designs of many of the presently available basket motors provide just enough gap so that the armature can freely rotate between the pole sections or pole pieces and the stationary core member. Thus, in order to improve the field density it is desirable to utilize materials having improved magnetic properties.

More particularly, it is desirable to utilize magnets made of permanent magnetic materials which possess a greater energy product (defined as the coercive force (oersteds) times the induction force (gauss)). One type of permanent magnetic material which is commonly utilized in the manufacture of motor magnets is an aluminum-nickel-cobalt alloy which is manufactured under the trademark "Alnico". Although this material may be satisfactory for many applications, it has been found that certain ceramic materials have even greater coercive capacity than "Alnico". Certain rare earth magnets, such as magnets made of samarium cobalt, will provide an even greater energy product. Motors requiring magnets having an induction force of about 4000 gauss or less frequently employ ceramic materials. However, motors requiring a greater working gap density generally employ Alnico magnets since the latter usually possess greater induction properties.

However, when manufacturing Alnico magnets having integrally-formed salient pole sections, a great deal of grinding must be done to shape the pole sections of the magnet to their desired shape and to insure mating of the magnetic surfaces within the motor to avoid air gaps. This increases the costs due to the labor expended and also the loss of material cut from the original form of the magnet before it is ground. Obviously, the more expensive the permanent magnet material, the greater the costs are in manufacturing the motor, particularly if the permanent magnet material is difficult to shape.

It is therefore a general object of the present invention to overcome the aforementioned problems.

More specifically, it is an object of the present invention to provide an improved electric motor and the method of making the same, which employs magnetic means of relatively small volume or mass and which is of a simple geometric shape so that materials providing a relatively stronger magnetic fulx density through the armature can be utilized without a substantial increase in costs.

Another object of the present invention is to provide an improved electric motor and a method of making the same in which commercially-available magnets of relatively simple design can be employed without the need for shaping the magnets to any particular geometrical shape.

A further object of the present invention is to provide a novel electric motor design which makes it commercially feasible to construct small size, high performance d.c. motors using permanent magnets made of expensive magnetic materials such as those belonging to the family of rare earth magnets.

Still another object of the present invention is to provide an electric motor which is designed to utilize a hollow low inertia rotor and substantially flat commercially-available magnets which can be assembled so as to establish a desired flux path through the rotor.

These and other objects can be achieved by an electric motor comprising at least two substantially flat magnets, preferably of the rare earth type, and at least two pole pieces of magnetically-conductive material. Each pole piece is secured to a corresponding one of the magnets. The magnets are then secured to the inside of a housing so that the pole pieces extend toward one another transversely of the longitudinal axis of the housing. The pole pieces are shaped so that the inner portions of the pole pieces are circularly curved and cooperate to define a cylindrical space in the housing between the pole pieces. A rotatable armature assembly and a stationary, magnetically-conductive core member are then mounted within the cylindrical space defined by the pole pieces so that the armature assembly is radially spaced from and disposed between the pole pieces on the one hand and the core member on the other hand.

Other features and many of the attendant advantages of the invention are described or rendered obvious by the following detailed description which is to be considered together with the accompanying drawings wherein:

FIG. 1 is a longitudinal sectional view of a preferred embodiment of a two-pole motor made in accordance with the present invention;

FIG. 2 is a second longitudinal sectional view of the same motor taken at a 45° axial rotation with respect to the view of FIG. 1;

FIG. 3 is a cross-sectional view taken along line 3 — 3 of FIG. 1;

FIG. 4 is a cross-sectional view of a modification of the FIG. 1 embodiment;

In the several views, like numerals refer to like parts.

Figure 7:
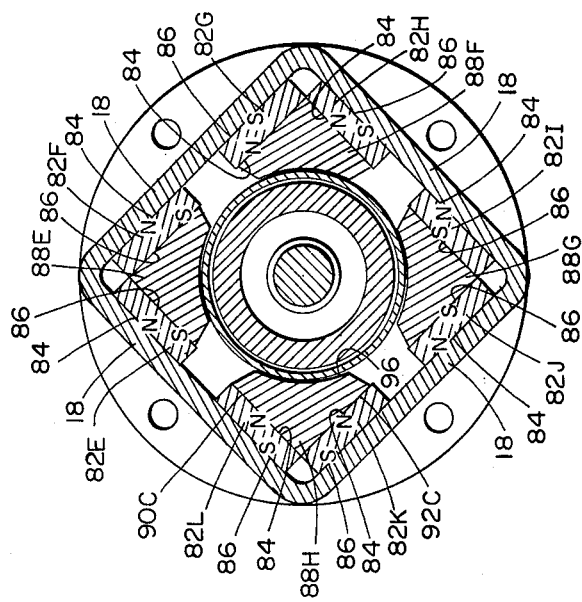
FIG. 7 is a cross-sectional view of the FIG. 5 embodiment taken along line 7 — 7 of FIG. 5.

Referring to FIGS. 1 - 3, there is shown a motor which generally comprises a tubular housing section 10 and a pair of end plates 12 and 14 secured at opposite ends of housing section 10 by any suitable means such as bolts 16 to form a closed housing. The housing section 10 and end plates 12 and 14 are preferably made of a magnetically-conductive material, but alternatively the housing parts may be of a non-magnetic material and their interior surfaces provided with a lining of magnetically-conductive material. Housing section 10 may be made in one piece or in the alternative it can be made in two or more mating parts which are secured together. The cross-sectional geometrical shape of housing section 10 is preferably equilateral polygon, e.g. a hexagon (as shown in FIG. 3), a square or the like, or in the alternative it can be circular (as shown in FIG. 4). The hexagonal configuration wherein housing section 10 is provided with six substantially flat sides 18 of equal length and width, is particularly suitable for the two-pole motor design shown in FIGS. 1 - 3. Each end of housing section 10 is counterbored to form an inner radially-directed shoulder 20. The outer surface of end plate 12 is provided with two or more holes 22 to receive mounting bolts (not shown) for mounting the motor to a supporting structure (not shown). The inner sides of end plates 12 and 14 are provided with annular pilot collars 24 and 26, respectively, which are coaxially aligned with one another and engage the opposite end of the housing in a tight fitting relationship.

End bell 12 is provided with a centrally-located aperture 30. The latter is counterbored to provide an annular radially-directed shoulder 32 in order to receive a stationary hollow cylindrical core member 34 and one end of an output shaft 36. End bell 14 is provided with a centrally-located aperture 38 in order to receive the other end of the output shaft 36. The core member 34 comprises an end section 40 and a main section 42. The end section has an inner annular shoulder 44 and an outer pilot collar portion 46, the latter being seated against the radially-directed shoulder 32 of the plate 12. At least the main section 42, and preferably the entire core member 34 is made of a magnetically-conductive material. The main section is preferably integrally formed with the end section 40 and extends into the casing formed by housing section 10 and end bell 12 and 14.

The shaft 36 is of a circular cross-section and includes a center section 48, the latter being concentrically positioned in and radially-spaced from core member 34. The shaft also comprises a reduced diameter section 50 which cooperates with section 48 to form an annular shoulder 52. Shaft 34 is preferably made of a non-magnetic material such as a non-magnetic steel or the like. The shaft is rotatably supported at one end in the stationary core member 34 and at its other end in aperture 38 of the plate 14, by means of bearings 54 and 56, respectively, which are of conventional construction.

Thus, although not shown in detail, it is to be understood that each bearing assembly comprises an inner race and an outer race separated by a plurality of ball or roller bearings. The inner races of both bearings 54 and 56 surround and engage the shaft and are restrained by retainer rings 55 and 60 which are snap-fitted in grooves on the shaft, while the outer race of the bearing 54 is held in place on one side by the inner annular shoulder 44 of the core member 34 and on the other side by a retainer ring 58 which is snap fitted in a groove formed in the end section 40. Similarly, the outer race of the bearing 56 is held in place by an inner annular shoulder 59 of the end plate 14. It will be obvious that other bearing arrangements can be used.

A hollow cylindrical armature 62 is coaxially mounted on the shaft 36 to rotate therewith. Hollow armatures are well known in the art and generally comprise electrically conductive windings supported by an insulating matrix or substrate. By way of example, the armature may be of the wound type described in U.S. Pat. Nos. 3,212,170, 3,441,761, 3,623,220, and 3,634,708, or of the printed circuit type described in U.S. Pat. Nos. 3,634,708, 3,650,021, 3,668,452 and 3,678,313. Preferably the armature is of the type disclosed in U.S. Pat. No. 3,212,170 and thus it comprises a closed portion 64 which surrounds and is molded to section 50 of shaft 36; a molded hollow cylindrical section 66 that coaxially surrounds, is radially spaced from and is free to rotate with respect to the stationary core member 34; and a circular array of commutator segments 68 each provided with a tang 70. The free end of cylindrical section 66 is flared outwardly as shown at 72. Also, although not shown, it is to be understood that armature 62 comprises a number of wound electrically-conductive overlapping coils (not shown) held together by an insulating plastic as described and illustrated in said U.S. Pat. 3,212,170; also the commutator segments are partially embedded in the plastic matrix and each coil is looped around the tang 70 of a different commutator segment. It will be appreciated that the shaft 36, armature member 62 and commutator segments 68 form an integral subassembly and that this subassembly constitutes the rotating component of the motor.

The motor of FIGS. 1 - 3 includes at least one pair of brushes 74 in order to electrically drive the armature member 62. The brushes are mounted at diametrically-opposite positions in the side wall of housing section 10. The brushes are mounted in electrical insulation sleeves or brush holders 76 and are biased into engagement with commutator segments 68 by compression coil springs 78 that are retained by conductive screws 80. The brushes 74 are conventional and may be made of any good electrically-conductive material such as silver-graphite or copper-graphite. The brushes are electrically connected to a D.C. current source (not shown) in any suitable manner, as will be obvious to one skilled in the art.

The elements of the motor thus far described are all conventional elements and, therefore, equivalents of these elements which are known in the art may be substituted therefor.

The present invention further comprises unique means for providing a relatively stronger permanent magnetic field without a substantial increase in costs. In the preferred form of the invention, the two pole motor shown in FIGS. 1 - 3, comprises four substantially identical permanent magnets 82 (A - D). The magnets are sized and shaped so that they are of a type which is commercially available. Preferably, the magnets are "bar" magnets (so-called because they have a rectangular block form) so as to include parallel and substantially flat top and bottom surfaces 84 and 86. Each magnet may be made of any well known magnetic material, depending on the magnetic field strength desired and the particular design application. Preferably, the magnets are made of any one of the known magnetic rare-earth materials, such as samarium-cobalt, since these rare-earth materials usually provide relatively high coercive capabilities as compared to Alnico and magnetic ceramic materials. Furthermore, rare-earth magnetic materials are in many cases more difficult if not impossible to demagnetize when employed in motors. For example, samarium-cobalt bar magnets of a size and type used in motors described herein, typically require about 18,000 oersteds to fully demagnetize, while comparable ceramic and "Alnico" magnets require about 4,200 and 1,600 oersteds, repectively. As a result of demagnetization, the residual magnetism of the samarium-cobalt magnet typically is at about 8,000 gauss while the ceramic and "Alnico" magnets is about 3,800 and 13,500 gauss, respectively.

The magnets 82 are magnetized in accordance with techniques well known in the art so that large surface 84 of the magnet is a north magnetic pole and the other surface 86 of the magnet is a south magnetic pole. In the two pole motor illustrated in FIGS. 1 – 3, the magnets 82A and 82B are respectively secured to the interior surface of two adjacent sides 18 of the housing 12. Similarly, the other two magnets 82C and 82D are respectively secured to the interior surfaces of the two adjacent sides 18 of the housing 12 diametrically opposite the first two magnets 82A and 82B. The magnets are oriented so that the surfaces 84, and thus the north magnetic poles of magnets 82A and 82B, are adjacent the interior surfaces of the housing, while the sides 86, and thus the south magnetic poles of the second two magnets 82C and 82D are secured against the interior surfaces of the housing.

In order to direct the magnetic field provided by the magnets 82 (A-D) through the hollow cylindrical section 66 of the armature 62, the inner sides of the magnets, i.e. those sides of the magnets opposite the housing, are connected to two pole pieces 88A and 88B. The two pole pieces are identical and are designed so that each pole piece can be placed in contact with the magnets. Both pole pieces are made of a magnetically-conductive material such as soft ferrous iron or the like, and are shaped so that they direct the magnetic field through diametrically opposite sides of the cylindrical section 66 of the armature 62. Specifically, each pole piece includes two substantially flat surfaces 90 and 92 which intersect at an angle approximately equal to the angle formed by the walls of the housing. In the preferred embodiment, this angle is about 120° (the polygonal angle of a hexagon). The surfaces 90 and 92 of pole piece 88A engage the surfaces 86 of the magnets 82A and 82B, respectively; and, the surfaces 90 and 92 of pole piece 88B engage respectively the surfaces 84 of the magnets 82C and 82D respectively. Each of the pole pieces 88A and 88B also includes two side surfaces 94 which extend generally radially of shaft 36 and are joined by an inner circularly curved surface 96. The inner surface 96 is of a constant radius and is positioned close to and spaced radially from the cylindrical section 66 of the armature 62. The inner surface 96 extends through an arc of approximately 120° although this angle may vary. As shown in FIG. 1, each end of the pole piece is bevelled as at 98 in order to provide clearance for the flared end 72 of the armature and also so that the inner surface 96 is coextensive with and thus concentrates substantially all of the magnetic field provided by the two pole pieces through the cylindrical section 66 of armature 62.

Although the invention has been described in its preferred form, various modifications can be made in which the same advantages will be achieved. For example, referring to FIG. 4, a cylindrical housing section 10A of circular cross-section is substituted for the housing section 10 of FIGS. 1 – 3. An adaptor 100 is utilized in order to magnetically couple and secure one or more bar magnets 82 to the interior circularly curved surface of the housing section 10A. (Although magnets 82 are shown in slightly different dimensions from the magnets shown in FIGS. 1 – 3, this in no way detracts from the advantages of the present invention, but merely affects the strength of the magnetic field provided). Each adaptor 100 is made of a magnetically conductive material, preferably the same material of which the pole pieces 88 are made. Each adaptor comprises an outer circularly curved surface 102 and an inner substantially flat surface 104. The radius of curvature of the outer surface 102 is approximately equal to the radius of curvature of the interior surface of the housing 10A so that it snugly engages the interior surface and provides a good magnetically conductive path between the two. The inner surface 104 of the adaptor provides a substantially flat surface upon which the flat magnet or magnets 82 can be attached. As shown in FIG. 4., where only one magnet 82 is provided for each pole piece, each of the pole pieces 88C and 88D has been modified so that they have one substantially flat surface 106 in place of the two flat surfaces 90 and 92 associated with the pole pieces 88A and 88B of FIGS. 1 3. The flat surface 106 engages the inner side of the magnet 82 so that inner circularly curved surface 96 is positioned close to and spaced radially from the cylindrical section 66 of the armature 62.

Figure 5:
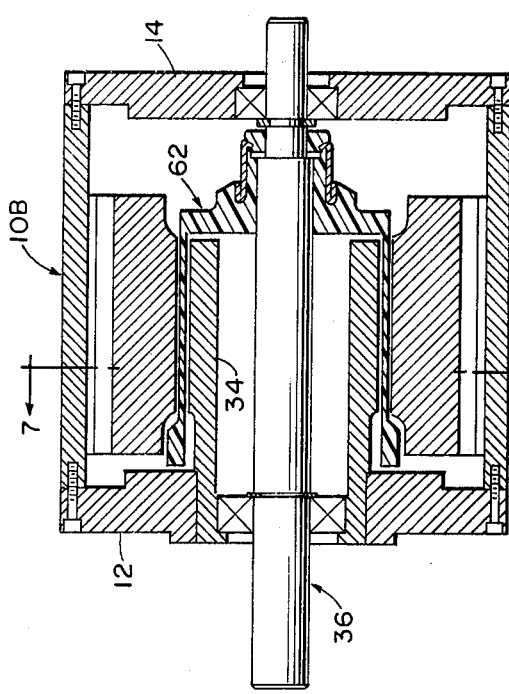
FIG. 5 is a longitudinal-sectional view of a preferred embodiment of a four-pole motor made in accordance with the present invention.
Figure 6:
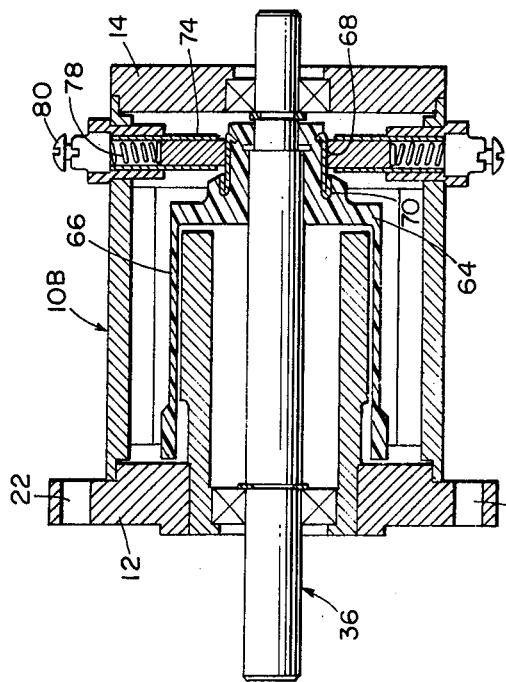
FIG. 6 is a second longitudinal-sectional view of the motor of FIG. 5 taken at a 90° axial rotation with respect to the view of FIG. 5.

The principles of the present invention which have been described with respect to a two pole motor, can be applied to motors having four, six, eight or more poles, without departing from the invention. For example, referring to FIGS. 5 – 7, a four pole motor is shown and described which is substantially identical to the two-pole motor design of FIGS. 1 – 3, except that the housing section 10B has been modified to accommodate eight bar magnets 82 (E – L) and four poles pieces 88 (E – H). The housing section 10B is provided with a substantially square cross-section with four sides 18 of equal length and width. The interior surface of each side 18 is at least twice as wide as any of the magnets so that two magnets can be secured to each interior surface of each side 18. The side edges of the two adjacent magnets are positioned close to or in contact with each other at each intersection of the interior surfaces of any two adjacent sides 18 of the housing 10B. The magnets are secured so that the magnets at diametrically opposite corners of the housing are magnetically oriented in the same direction. More specifically, referring to FIGS. 5 – 7, the magnets are oriented so that the surfaces 84 and thus the north magnetic poles of four of the magnets 82 E, F, I, and J are secured to the interior surface of the sides 18 of the housing 10B, while the surface 86 and thus the south magnetic poles of the other four magnets 82 G, H, K, and L are secured in place against the interior wall of a corresponding one of the sides 18 of the housing 10B.

The four pole pieces 88E, F, G, and H are shaped so that the two substantially flat surfaces 90C and 92C intersect at about a 90° angle so that the two surfaces of each pole piece engage the surfaces of the two magnets in each intersecting corner of the housing. The inner circularly curved surface 96 of each pole piece extends through a radial angle of approximately 45°, although this angle may vary.

In each of the above-described embodiments, the pole pieces, magnets and housing are engaged in substantially a tight fitting relation with one another. It is noted that even though relatively thin air gaps may be present within the magnetic path and in particular between the housing, magnets and pole pieces, these air gaps will have relatively little or no affect on the operation of the motor because of the greater energy product provided by the magnets. The pole pieces, magnets and housing can be secured together in any suitable manner such as cementing them together with an anaerobic cement which preferably has magnetically-conductive properties. Also, in each embodiment, the magnets are polarized in a radial direction, toward the axis of the armature 62 and shaft 36. Thus, each pole piece engaging the magnets forms either a north or south pole for magnetic interaction with the armature. More specifically, with reference to FIGS. 1 - 3, a magnetic flux path is provided which extends in turn from the south magnetic poles (surface 86) of the magnets 82A and 82B through the pole piece 88A, through the magnetic core member 34, back through the cylindrical section 66 of the armature, the opposite pole piece 88B to the north magnetic poles (or surfaces 84) of the magnets 82C and 82D through the latter two magnets and the housing 10 to the north magnetic poles (or surfaces 84) of the first two magnets 82A and 82B. With respect to FIGS. 5 - 7, the magnetic flux paths extend from the south magnetic poles (surfaces 86) of the magnets 82E and 82F and from the south magnetic poles (surfaces 86) of the magnets 82I and 82J through the pole pieces 88E and 88G, respectively, through the cylindrical section 66 of the armature 62 and the magnetic core member 34, back through the cylindrical section 66 to both the pole pieces 88F and 88H to the north magnetic poles (surfaces 84) of the magnets 82G, 82H, 82K and 82L; through these latter magnets and the housing 10B to the north magnetic poles (surfaces 84) of the first-mentioned magnets 82E, 82F, 82I and 82J. As is well known in the art, if a D.C. current source is coupled across the two brushes, the commutator will be electrically connected to the windings of the armature member 62, with the result that the several windings provide magnetic fields which interact with the magnetic field provided by the magnets and pole pieces to produce torque on armature member 62, thereby causing shaft 36 to rotate.

In accordance with the method of the present invention, the above-described motors can be manufactured and assembled using commercially-available rare earth magnets of standard sizes and shapes, thereby providing improved electromagnetic performance without any great increase in cost.

The preferred method of assembling the permanent magnet stator assembly of the motor will now be described. First, the housing section 10 is pre-formed and the pole pieces 88 are sintered to size in a manner well known in the art so as to have surfaces 90, 92 and 94, with the two surfaces 94 intersecting one another so that initially each pole piece has a diamond-shaped cross-section, or with a fifth surface connecting ends of surfaces 94 and arranged so that it can be cut back to form surface 96. The magnets are then secured to the appropriate surfaces of the pole pieces. More specifically, in the two pole arrangement shown in FIGS. 1 - 3, the surfaces 86 of the magnets 82A and 82B are secured respectively to the surfaces 90A and 92A of the pole piece 88A. Similarly, the surfaces 84 of the magnets 82C and 82D are secured respectively to the surfaces 90B and 92B of the pole piece 88B. In the two pole arrangement shown in FIG. 4, the surface 84 of one magnet and the surface 86 of the other magnet 82 are respectively secure to the reasonably flat surfaces 106 of the pole pieces 88D and 88C. In the four pole motor design of FIGS. 5 - 7, the surfaces 86 of magnets 82E and 82F are secured to the appropriate surfaces of pole piece 88E, the surfaces 84 of magnets 82G and 82H are secured to the appropriate surfaces of pole piece 88F, the surfaces 84 of magnets 82I and 82J are secured to the appropriate surfaces of pole piece 88G and the surfaces 84 of magnets 82K and 82L are secured to pole piece 88H. In the FIG. 4 embodiment, the surfaces 104 of the adaptors 100 are secured to the exposed surfaces of the magnets 82.

The magnets and pole pieces are now secured to the inside of housing section 10 so that the pole pieces extend toward one another. Specifically, in FIGS. 1 - 3, the magnets 82A and 82B and pole piece 88A are secured to the inside of the housing 10 by attaching the surfaces 84 of the magnets to the inside surfaces of two adjacent sides 18 of the housing. Similarly, the magnets 82C and 82D and pole piece 88B are secured to the inside of the housing 10 by attaching the surfaces 86 of the magnets to the inside surfaces of the two adjacent sides 18 of the housing, so that the pole pieces 88A and 88B are disposed diametrically opposite to one another. In the FIG. 4 embodiment the pole pieces and magnets are secured at diametrically opposite positions within the housing by securing surfaces 102 of the adaptors 100 to the inside of the housing 10. Similarly, in the embodiment of FIGS. 4 - 7, the magnets 82E and 82F and pole piece 88E, are secured to the interior of the housing 10B by securing the surfaces 84 of the magnets to the sides 18 of the housing. The magnets 82I and 82J together with pole piece 88G are secured to the diametrically opposite side of the housing by securing the surfaces 84 of the magnets 82I and 82J to the interior of the housing. The magnets 82G and 82H and pole piece 88F are secured to the inside of the housing at an approximate 90° angle from both pole pieces 88E and 88G by securing the surfaces 86 of the magnets 82G and 82H to the sides 18 of the housing. Finally, the magnets 82K and 82L and pole piece 88H are secured to the inside of the housing at an approximate 90° angle to the pole pieces 88E and 88G and diametrically opposite the pole piece 88F, by securing the surfaces 86 of the magnets 82K and 82L to the sides 18 of the housing.

The magnets and pole pieces, (and in the case of the FIG. 4 embodiment, the adaptors 100) are secured together as well as to the housing by preferably using suitable means such as a suitably prepared epoxy or anaerobic cement. One such cement is manufactured under the trademark "Loctite".

The pole pieces are now in position so that they can be shaped in part, in situ, whereby the inner surfaces 96 are formed as circularly curved surfaces which are precisely concentric with and properly spaced from the armature. The surfaces 96 can be formed by boring the pole pieces endwise on a lathe with the boring axis of the lathe being the same as the intended axis of rotation of shaft 36. The rotatable armature assembly comprising the shaft 36 and armature member 62 and also the magnetically-conductive core member 34 are mounted within the cylindrical space formed by the inner circularly curved surfaces 96 of the pole pieces so that the armature member 62 is disposed coaxially between the pole pieces on the one hand and the core member on the other hand. The plates 12 and 14 are secured to the housing 10 by the bolts 16 and the brushes are mounted in sleeves 76 and biased into contact with the commutator 68 by springs 78 and screws 80.

In an alternative method, the preferred method is modified to the extent that the pole pieces are secured to the magnets after the magnets are secured to the inside of the housing.

The invention as herein described and illustrated offers a number of important advantages. For one thing, by using commercially-available magnets without the need of additional machining to form the magnets to any particular shape, magnets of relatively small volume or mass and of a simple geometric shape and yet having a relatively stronger magnetic flux density through the armature can be utilized without a substantial increase in cost. Use of rare earth magnets, which generally have the highest coercive strength to date, allows for thin section magnets. This results in about a 30% reduction in motor diameter from those motors using Alnico for equivalent performance. For example, a motor constructed generally as shown in FIGS. 1 - 3 and having a 2½ inch outside across the corners of the housing was found to have performance characteristics comparable to a commercially-available basket motor having a 4-inch outside diameter. Another advantage is provided by the method of the present invention in which at least part of the pole pieces are formed in situ, whereby the pole pieces are easily and inexpensively mounted in the housing 10. A further advantage is provided by the arrangement of magnets and pole pieces which concentrate the magnetic fields of the magnets so as to substantially maximize the effect of such fields on the winding of the armature with minimum flux leakage, thereby making possible high performance motors having one or more pairs of magnets extending close to and parallel to the hollow armature. Additionally, the preferred embodiments of the motor of the present invention are made from commercially available magnets, sintered pole pieces and a welded steel tubing housing with no machining or grinding for low cost parts and assembly. Still other advantages will be obvious to persons skilled in the art.

Since certain changes may be made in the above apparatus without departing from the scope of the invention herein involved, it is intended that all matter contained in the above description or shown in the accompanying drawings shall be interpreted in an illustrative and not in a limiting sense.

I claim:
1. In a dynamo-electric machine of the type comprising a housing having a cross-section such that at least two oppositely disposed portions of the interior surfaces of said housing are curved in cross-section; a rotatable shaft mounted in said housing; a hollow armature concentrically mounted on said shaft so that a least a portion of said armature is radially spaced from said shaft; a stationary, magnetically-conductive core member extending into the space provided between said armature and said shaft; at least two substantially flat mutually spaced magnets secured within said housing and spaced radially from said armature; and at least two pole pieces of magnetically-conductive material, each of said pole pieces being secured to a different one of said magnets, said pole pieces extending toward and terminating short of said armature; wherein the improvement comprises:
at least two magnetically-conductive adaptors for securing said magnets to said housing, said adaptors being disposed between said magnets and said housing, each of said adaptors having a curved surface secured to and mating with a respective one of said interior surfaces of said housing and a substantially flat surface secured to and supporting at least one of said magnets.

2. A machine in accordance with claim 1, wherein each of said magnets is made of samarium-cobalt.

3. A dynamo-electric machine comprising:
a housing having a circular cross-section;
a rotatable shaft mounted in said housing;
a hollow armature concentrically mounted on said shaft so that at least a portion of said armature is radially spaced from said shaft;
a stationary, magnetically-conductive core member extending into the space provided between said armature and said shaft;
at least two substantially flat mutually spaced magnets disposed inside of said housing and spaced radially from said armature;
at least two pole pieces of magnetically-conductive material, each of said pole pieces being secured to a different one of said magnets, said pole pieces extending toward and terminating short of said armature, wherein each of said pole pieces includes (a) one substantially flat surface secured to one of said magnets, (b) side surfaces extending inward from the edges of said flat surface toward said armature, and (c) an inner circularly curved surface adjacent to and spaced from said armature connecting said side surfaces; and
at least two magnetically-conductive adaptors for securing said magnets to said housing, said adaptors being disposed between said magnets and said housing, each of said adaptors having a circularly-curved surface curved to the interior of said housing and a substantially flat surface secured to and supporting at least one of said magnets.

* * * * *